United States Patent Office 3,838,186
Patented Sept. 24, 1974

3,838,186
WAX TREATMENT OF PARTICULATE MATERIAL
Leslie Jasper Ahrens, Durban, Natal, Republic of South Africa, assignor to Process Wax and Resin Products (Proprietary) Limited, Jacobs, Natal, Republic of South Africa
No Drawing. Filed Apr. 26, 1972, Ser. No. 247,708
Claims priority, application Republic of South Africa, Apr. 29, 1971, 71/2,773
Int. Cl. B29c 23/00; C08f 45/52
U.S. Cl. 264—12                2 Claims

ABSTRACT OF THE DISCLOSURE

The invention relates to wax compositions particularly for the wax treatment of particulate wood and other fibrous products, comprising a fibrillated mass, the fibres of which have a plurality of free-ended strands, prepared by blowing a wax composition containing a wax and polyolefin.

---

This invention relates to a wax composition for use in a large number of applications and in particular for use for the wax treatment of particulate material, for example in the paper industry and in the wax treatment of particulate wood or other fibrous products for the preparation of particle board.

The wax treatment of wood particles in the manufacture of particle board has been practised for many years and the accepted method of applying the wax has been by means of an emulsion. This method has suffered from the disadvantage that the board has swelled to an unpredictable extent, thus leading to an inconsistent product.

It is an object of the present invention to provide a wax composition which substantially overcomes the swelling disadvantage and at the same time improving the water repelling qualities of the resulting particle board. A wax composition according to the invention comprises a fibrillated mass, the individual fibres having a plurality of free-ended strands.

In the preferred form of the invention, the fibrillated mass is prepared by subjecting a molten mass of the composition to a current of air whereby the molten mass is blown into a fibrillated product. The current of air may be blown at right angles to a flow of the molten wax composition.

The wax composition may be a mixture of a natural or synthetic wax and a polymeric material and a polyolefin is preferred as the polymeric material. Polyethylene has been found to be imminently suitable.

Still further according to the invention, the resulting blown product is further treated by agitating the mass, for example in a shaker.

The product resulting from the blowing operation is characterised by a plurality of strands. Such a product is suitable for many applications but it may be improved, especially for particle treatment, by shaking or the like. This results in the fibre ends being split.

The excellent results obtained in the particle board industry is probably due to the presence of the stranded fibrillated form whereby a tendency to adhere to the particles is induced thereby facilitating and ensuring an efficient distribution of the composition which in turn, results in improved lubrication and therefore an improved glue coverage and more efficient forming of the "lap." These advantages, in turn, lead to a surprising improvement as regards undesirable swelling of the resulting board, and it has been found that the swelling of the resulting board is reduced to about 4 percent (as compared with values of from 8 to 12 percent when using prior art compositions). In addition, a study of power-consumption to loading ratio had indicated a distinct advantage having regard to prior art compositions.

A further improvement of the composition can be obtained for certain applications by the addition of finely-ground aluminium sulphate while the addition of chlorine-containing pesticidal compositions are recommended for products such as bagasse boards.

The composition of the invention may be applied to the particulate material by means of a shaker, perforated disc, air carriage or hand dosage.

Other uses for the composition of the invention are for the curtain-coating of fibreboard, as a compounding aid in polyvinyl chloride, as an additive in rubber compounding, as a release agent and gloss imparter in candle manufacture, for the manufacture of a wax cloth as a packaging aid for objects, and in particular, for citrus and deciduous fruits, incorporation in the manufacture of fibre ropes and twines (as a lubricant and fungicide carrier) and as a lubricant in wire rope cores. Variations in grade of the compositions of the invention can be achieved by using various types of wax and various polymeric materials. Thus various grades of Fischer-Tropsch synthetic waxes may be used together with various grades of high density or low density polyethylenes. A typical example of a composition according to the invention is as follows:

70 percent low density polyethylene
30 percent wax (Fischer-Tropsch 145° F. m.pt.)

The influence of the melt temperature is important. A low temperature results in an elongated fibrous mass whereas a temperature of about 10 to 20° above the melting point is more suitable since it results in a shorter fibre length. The wax-polymer mixture may be melted in a kettle with an orifice at a low position. A stream of air at any convenient temperature and pressure, e.g. ambient temperature and 20 p.s.i., is directed on to the descending stream of the molten mixture. The stream of air is preferably generated by means of a high volume/low velocity blower into a receiving chamber for collection. Thereafter, the fibrillated product in which of course the fibers are cold and plastic solid at this stage, is transported to a shaker where it is shaken to break down the dimensions of the fibres and to shred the ends thereof to achieve the required strands. Hand beating of the blown mass may be employed prior to introduction into the shaker. The mass should be cooled before the shaking operation.

The shaker may be of the shuttle type, eccentrically driven and may be single- or multiple-screened. Other grades of Fischer-Tropsch waxes that have been found to be very useful in the present invention include the wax distillate, and those having melting points of 116° F., and 190° F. Also, petroleum waxes may be used, such as a petroleum wax melting at about 145° F. or a microcrystalline wax melting at about 180–190° F.

Further additives to the compositions include polyvinyl acetate, wood rosin, small amounts of mineral oil, petroleum jelly and the like.

Other waxes which may be used include sperm wax, beeswax, ceresin, and the like.

The amount of wax composition required to be added to wood chips should be approximately about 0.4 to 4.0 percent by weight. The adhesive to be used may be ureaformaldehyde, melamine formaldehyde, melamine urea formaldehyde, phenol formaldehyde, resorcinol formaldehyde or phenol/resorcinol formaldehyde.

We claim:
1. A process for preparing fibers of a wax composition which is a mixture of wax and polyethylene, comprising establishing a molten mass of said wax composition at a temperature about 10 to 20° F. above its melting point, pouring a stream of said composition from said molten mass, blowing a stream of air under pressure across said stream to subdivide said stream into fibers having a plurality of free-ended strands, cooling said fibers, and agitating said fibers to shred the fiber ends.

2. A process as claimed in claim 1, in which said wax is a Fischer-Tropsch wax and said polyethylene is a low density polyethylene.

References Cited
UNITED STATES PATENTS

| | | | |
|---|---|---|---|
| 3,671,210 | 6/1972 | Richardson | 264—12 |
| 3,649,233 | 3/1972 | Batigelli | 264—12 |
| 3,560,179 | 2/1971 | Kleist | 264—12 |
| 3,532,479 | 10/1970 | Stalego | 264—12 |
| 3,254,977 | 6/1966 | Lévecque et al. | 264—12 |

MORRIS L. LIEBERMAN, Primary Examiner

S. L. FOX, Assistant Examiner

U.S. Cl. X.R.

260—28.5 A